United States Patent [19]
Hirai et al.

[11] Patent Number: 5,235,445
[45] Date of Patent: Aug. 10, 1993

[54] LIQUID CRYSTAL OPTICAL ELEMENT WITH LIQUID CRYSTAL IN POLYMER MATRIX WITH PARTICULAR MODULUS OF ELASTICITY

[75] Inventors: Yoshinori Hirai; Satoshi Niiyama; Hiroshi Kumai; Tomoki Gunjima, all of Yokohama, Japan

[73] Assignee: AG-Technology Co., Ltd., Yokohama, Japan

[21] Appl. No.: 869,961

[22] Filed: Apr. 17, 1992

[30] Foreign Application Priority Data

Apr. 17, 1991 [JP] Japan .................. 3-112562

[51] Int. Cl.$^5$ .................................. G02F 1/13
[52] U.S. Cl. .................................. 359/52; 359/51
[58] Field of Search .................... 359/51, 52

[56] References Cited

U.S. PATENT DOCUMENTS

| | | | |
|---|---|---|---|
| 3,872,050 | 3/1975 | Benton et al. | 359/51 |
| 4,435,047 | 3/1984 | Fergason | 359/52 |
| 4,728,547 | 3/1988 | Vaz et al. | 359/51 |
| 4,834,509 | 5/1989 | Gunjima et al. | 359/52 |
| 4,890,902 | 1/1990 | Doane et al. | 359/52 |
| 5,103,327 | 4/1992 | Hirai et al. | 359/51 |
| 5,150,232 | 9/1992 | Gunjima et al. | 359/81 |

FOREIGN PATENT DOCUMENTS

0156615 10/1985 European Pat. Off.
0272585 6/1988 European Pat. Off.

*Primary Examiner*—William L. Sikes
*Assistant Examiner*—Anita Pellman Gross
*Attorney, Agent, or Firm*—Oblon, Spivak, McClelland, Maier & Neustadt

[57] ABSTRACT

A liquid crystal optical element comprises a pair of substrates with electrodes and a liquid crystal and polymer composite material, which is interposed between the pair of substrates, in which liquid crystal is dispersed and held in a polymer matrix so that the refractive index of the polymer matrix substantially coincides with the refractive index of the liquid crystal used in either state of applying a voltage or without applying voltage, and the refractive indices don't coincide with each other in the other state, wherein the elastic modulus of the polymer material which forms the polymer matrix is $3 \times 10^7 \mathrm{N/m^2}$ or less at 20° C. and $1 \times 10^3 \mathrm{N/m^2}$ or more at 40° C.

20 Claims, 1 Drawing Sheet

LIQUID CRYSTAL OPTICAL ELEMENT WITH LIQUID CRYSTAL IN POLYMER MATRIX WITH PARTICULAR MODULUS OF ELASTICITY

The present invention relates to a liquid crystal optical element and a liquid crystal display element each having a pair of substrates with electrodes and a polymer matrix interposed between the substrates, in which liquid crystal is dispersed and held in the polymer matrix, and a projection type liquid crystal display apparatus using such optical or display element.

In recent years, liquid crystal displays have been widely used for personal word processors, hand-held computers, portable TV sets and so on, taking the advantages of low power consumption, low driving voltage and so on. Of the liquid crystal displays, liquid crystal display elements having an active element for each picture element electrode have particularly been noted and developed.

As such liquid crystal display elements, there was a proposal on liquid crystal display elements in which a dynamic scattering mode (DSM) liquid crystal was used. However, the liquid crystal display element of this type had a disadvantage of large current consumption because a high value of electric current passed in the DSM liquid crystal. Now, liquid crystal display elements in which a twist nematic (TN) type liquid crystal is used have been widely used. For instance, portable TVs have been widely commercialized. Since the TN type liquid crystal display element has a very small leak current and a small power consumption, it is suitable for using a battery as a power source.

When the liquid crystal display element using active elements is used for DS mode, the leak current of the liquid crystal itself is large. Accordingly, it was necessary to provide a large storage capacitance in parallel to each picture element, and the power consumption of the liquid crystal display element itself is large.

In the TN mode, since a leak current in the liquid crystal itself is very small, it is unnecessary to provide a large storage capacitance and the power consumption of the liquid crystal display element itself can be small.

In the TN mode liquid crystal, however, there is problem that the transmittance of light is small because two polarization plates are required. In particular, when a color filter is used for obtaining a colored display, only several percents of incident light can be utilized. It is, therefore, necessary to use a strong light source, as a result of increasing power consumption.

Further, the TN mode liquid crystal display element has disadvantages of requiring a very strong light source for projecting a picture image on a projection screen, difficulty in obtaining a high contrast on the projection screen, and adverse effect to the liquid crystal display element due to heat from the light source.

In order to solve the problems in the TN mode liquid crystal display element, there is proposed such mode that a liquid crystal and polymer composite material in which a nematic liquid crystal is dispersed and held in a polymer matrix is used, and a low voltage such as 10 V or lower is sufficient to drive it by utilizing the scattering-transparent characteristics.

However, in the conventional liquid crystal and polymer composite material, there was hysteresis in the voltage-transmittance characteristics, that is, there was a problem that the transmittance during the increase of voltage is different from that during the decrease of voltage. Accordingly, there was a problem of a phenomenon of image-stricking wherein a picture image which had appeared in the display just before the changing of picture remained in the present display for several seconds. The present invention is to provide a liquid crystal optical element or a liquid crystal display element having a high brightness and a high contrast ratio, capable of providing a clear gray scale display and reducing an image-sticking phenomenon due to the hysteresis of the liquid crystal and polymer composite material.

In accordance with the present invention, there is provided a liquid crystal optical element comprising a pair of substrates with electrodes and a liquid crystal and polymer composite material, which is interposed between the pair of substrates, in which liquid crystal is dispersed and held in a polymer matrix so that the refractive index of the polymer matrix substantially coincides with the refractive index of the liquid crystal used in either state of applying a voltage or without applying a voltage, and the above refractive indices don't coincide with each other in the other state, characterized in that the elastic modulus of the polymer material which forms the polymer matrix is $3 \times 10^7$ N/m$^2$ or less at 20° C. and $1 \times 10^3$ N/m$^2$ or more at 40° C.

In accordance with the present invention, there is provided a liquid crystal display element for effecting a display including a half-tone display which comprises an active matrix substrate having an active element for each picture element electrode, a counter electrode substrate provided with a counter electrode and a liquid crystal and polymer composite material in which a nematic liquid crystal having a positive dielectric anisotropy is dispersed and held in a polymer matrix so that the refractive index of the polymer matrix substantially coincides with the ordinary refractive index ($n_0$) of the liquid crystal used, said liquid crystal and polymer composite material being interposed between the active matrix substrate and the counter electrode substrate, characterized in that the elastic modulus of the polymer material which forms the polymer matrix is $3 \times 10^7$ N/m$^2$ or less at 20° C. and $1 \times 10^3$ N/m$^2$ or more at 40° C.

In accordance with the present invention, there is provided a projection type liquid crystal display apparatus which comprises a projection light source, a projection optical system, a liquid crystal display element comprising an active matrix substrate having an active element for each picture element electrode, a counter electrode substrate provided with a counter electrode and a liquid crystal and polymer composite material in which a nematic liquid crystal having a positive dielectric anisotropy is dispersed and held in a polymer matrix so that the refractive index of the polymer matrix substantially coincides with the ordinary refractive index ($n^0$) of the liquid crystal used, said liquid crystal and polymer composite material being interposed between the active matrix substrate and the counter electrode substrate, wherein the elastic modulus of the polymer material which forms the polymer matrix is $3 \times 10^7$ N/m$^2$ or less at 20° C. and $1 \times 10^3$ N/m$^2$ or more at 40° C.

In accordance with the present invention having the above-mentioned construction, there is obtainable a liquid crystal optical element or a liquid crystal display element each being capable of reducing an image-sticking phenomenon due to hysteresis, having a high contrast ratio and being driven at a low voltage.

In the present invention, there is used a liquid crystal and polymer composite material in which liquid crystal is dispersed and held in a polymer matrix which is interposed between a pair of substrates with electrodes, and in which the refractive index of the polymer matrix substantially coincides with the refractive index of the liquid crystal used in either state of applying voltage or without applying a voltage, and the above-refractive indices don't coincide with each other in the other state. It is particularly preferable to use a liquid crystal and polymer composite material in which a nematic liquid crystal having a positive dielectric anisotropy is dispersed and held in a polymer matrix, and the refractive index of the polymer matrix substantially coincides with that of the ordinary refractive index ($n_0$) of the liquid crystal used. The liquid crystal and polymer composite material is interposed between an active matrix substrate having an active element for each electrode for picture element and a counter electrode substrate with a counter electrode.

The substrates with electrodes are such one made of glass, plastics, ceramics or the like on which electrodes are formed.

Normally, the electrodes are formed to be transparent electrodes composed of ITO ($In_2O_3$-$SnO_2$), $SnO_2$ or the like. A metallic electrode made of a material such as Cr, Al or the like may be used in addition to the above-mentioned electrodes, if necessary. When the above-mentioned electrodes are used for a reflection type display apparatus, they can be used as reflection electrodes. Further, as the pair of substrates, there may be a combination of an active matrix substrate and a counter electrode substrates.

The active matrix substrate is composed of a substrate on which electrodes and active elements such as thin film transistors, (TFTs), thin film diodes, metal-insulation-metal-non-linear resister device (MIN) or the like are formed. A single or a plurality of active elements are connected to each of the picture element electrodes.

The counter electrode is composed of a substrate on which electrodes are formed. The counter electrode is combined with the active matrix substrate so as to be capable of providing a display.

The liquid crystal and polymer composite material is interposed between the above-mentioned pair of substrates with electrodes. The liquid crystal and polymer composite material is such one that the refractive index of liquid crystal in the liquid crystal and polymer composite material is changed depending on a state of applying a voltage. When the refractive index of the polymer matrix substantially agrees with the refractive index of the liquid crystal, light is transmitted, and when the former does not agree with the latter, the light is scattered. Since no polarization plates are used, a bright display can be easily obtained.

In the above-case, since the refractive index of the polymer matrix is in substantially coincidence with the ordinary refractive index ($n_O$) of the liquid crystal used, light is transmitted when a voltage is applied, and the light is scattered when no voltage is applied. When a voltage is applied, liquid crystal molecules are oriented in parallel to the direction of the application of an electric field. Accordingly, it is easy to control the refractive indices, and a high transmittance is obtainable in a display element of this type when the light is transmitted.

The liquid crystal optical element of the present invention can be mainly used as a liquid crystal display element. It can also be used as a light controllable window or an optical shutter.

The liquid crystal display element of the present invention can be used not only as a direct view type display element but also a projection type display element. When the liquid crystal display element of the present invention is used as the direct view type display element, a display apparatus may be constituted in combination with a backlight, a lens, a prism, a mirror, a diffusion plate, a light absorbing material, a color filter and so on in accordance with the display characteristics which are desired to obtain.

The liquid crystal display element of the present invention is, in particular, suitable for a projection type display apparatus, and the projection type liquid crystal display apparatus can be constituted by combining the liquid crystal display element with a projection light source, a projection optical system and so on.

A conventional projection light source and a conventional projection optical system such as a lens may be used for the light source and the projection optical system. Generally, the liquid crystal display element is arranged between a projection light source and the projection lens.

In the liquid crystal display element of the present invention, a transparent-scattering type liquid crystal and polymer composite material is interposed between a pair of substrates with electrodes. Specifically, according to the present invention, the liquid crystal optical element comprising a liquid crystal and polymer composite material in which liquid crystal is filled in a large number of fine holes formed in the polymer matrix, is used. The liquid crystal and polymer composite material is put between a pair of substrates with electrodes. When a voltage is applied across the electrodes of the liquid crystal optical element, the refractive index of the liquid crystal optical element is changed, and the relation between the refractive index of the polymer matrix and the refractive index of the liquid crystal is changed. Namely, there can be used such a liquid crystal optical element that when the refractive indices of the both members are in agreement with each other, a state of transmission is provided, and when not, a state of scattering is provided.

The liquid crystal and polymer composite material comprising the polymer matrix having a large number of fine holes and the liquid crystal filled in the fine holes has such a structure that the liquid crystal is sealed in vacuoles such as microcapsules wherein the individual microcapsules may not be completely independent or the individual vacuoles may be communicated with each other through fine gaps like a porous material.

The liquid crystal and polymer composite material used for the liquid crystal display element according to the present invention can be prepared as follows. Liquid crystal and a curable compound for forming the polymer matrix are mixed to obtain a solution or a latex. Then, the solution or latex is cured by the application of light or heat, or by removing solvent or by subjecting it to reactive curing thereby separate the polymer matrix and to disperse the liquid crystal in the polymer matrix.

In the present invention, a polymer material having an elastic modulus of $3 \times 10^7$ N/m$^2$ or less at 20° C. and an elastic modulus of $1 \times 10^3$ N/m$^2$ or more at 40° C. is used. It is particularly preferable that the most portion of a temperature range used falls in the above-mentioned range. Thus, an image-sticking phenomenon due to hysteresis can be reduced.

Use of the photo-curable or heat-curable type compound is preferred since it can be cured in an enclosed system.

In particular, use of a photo-curable type compound is preferred since it can be cured in a short period of time with little influence of heat.

As a specific production method, a cell may be formed by using a sealing material; an uncured mixture of the liquid crystal and the curable compound is injected from the injection port in the same manner as in the conventional nematic liquid crystal display element, and after sealing the injection port, they can be cured by light irradiation or heating.

The liquid crystal optical element according to the present invention may also be prepared without using a sealing material, for example, by supplying an uncured mixture of the liquid crystal and the curable compound on a substrate provided with a transparent electrode, overlaying, on that substrate, another substrate with an electrode and then curing the mixture by means of light-irradiation or the like.

The periphery of the liquid crystal optical element assembly may be sealed by coating the sealing material. According to this production method, since it is only required to supply the uncured mixture of the nematic liquid crystal and the curable compound by means of coating such as roll coating, spin coating, printing or by the method of using a dispenser or the like, the injection step is simple and the productivity is extremely high.

Further, the uncured mixture of the liquid crystal and the curable compound may be incorporated with spacers for controlling the inter-substrate gap such as ceramic particles, plastic particles or glass fibers, pigments, dyes, viscosity controllers or any other additives which does not adversely influence to the performance of the liquid crystal optical element of the present invention.

During the curing step of the liquid crystal optical element which shows a transparent state when a voltage is applied, if the element is cured under the condition that a sufficiently high voltage is applied to only a specified portion, it is possible to render that portion to be a state of normally light transmittance. Accordingly, when a fixed display is desired, such normally light transmittance portion may be formed.

On the contrary, in a case of using the liquid crystal optical element which shows a scattering state when a voltage is applied, a normally scattering portion can be formed in the same manner as the above.

In the liquid crystal optical element using the liquid crystal and polymer composite material, higher transmittance in the light transmission state is preferable and the haze value in the light scattering state is preferably not less than 80%.

In the present invention, it is preferable that the refractive index of the polymer matrix (after curing) agrees with the ordinary refractive index ($n_0$) of the liquid crystal used, in a state of applying voltage.

Thus, light is transmitted when the refractive index of the polymer matrix agrees with the refractive index of the liquid crystal, while the light is scattered (opaque) when they do not agree with each other. The scattering property of the element is higher than that of the liquid crystal display element in the conventional DS mode and a display having a high contrast ratio can be obtained.

The major object of the present invention is to provide a liquid crystal optical element capable of being driven at a low voltage while an image-sticking phenomenon due to the hysteresis of a liquid crystal and polymer composite material is minimized. The liquid crystal optical element can provide a high performance such as a high density display in combination with active elements. The liquid crystal optical element of the present invention also has excellent performance in another usage (an optical shutter, a display, a spatial light modulator and so on) which requires a half-tone display.

In the conventional liquid crystal and polymer composite material, there appeared hysteresis in the voltage-transmittance characteristics, this causing a trouble in gray-scale displaying. The hysteresis is a phenomenon that transmittance is different between a course of increasing the voltage and a course of decreasing the voltage. If the hysteresis exists, an information which has appeared in a picture image remains in gray-scale displaying. Namely, the image-sticking is apt to occur to thereby deteriorate the quality of picture image.

As one of the causes which produce the hysteresis in the liquid crystal and polymer composite material, there is a structure in the composite material wherein the liquid crystal is dispersed and held in the polymer matrix. Namely, it is considered that there is the hysteresis by the interaction of the liquid crystal existing in the polymer matrix in a separate form. The magnitude of the hysteresis is determined by an elastic energy stored in the liquid crystal held in the polymer matrix, an electric energy caused by an electric field applied from the outside and energy by the interaction of the liquid crystal existing in a separate form in the polymer matrix. Accordingly, the hysteresis can be reduced by optimizing balance of the energies, and an excellent display in which there is no image-sticking can be obtained even in a gray-scale display.

It is an object of the present invention to provide a liquid crystal optical element having a high contrast ratio, high brightness and excellent response and capable of reducing hysteresis. Further, the object of the present invention is to obtain a liquid crystal optical element which can be driven with use of a conventional TN active element and a conventional driving circuit.

Important factors to determine the above-mentioned energy balance are the average particle diameter R of the liquid crystal dispersed and held in the polymer material, the shape of the liquid crystal particles, the (specific) dielectric constant and the dielectric anisotropy $\Delta\epsilon$ of the the liquid crystal, the elastic constant of the liquid crystal, the elastic modulus and the dielectric constant of the polymer matrix and so on. For optimization to obtain the above-mentioned object, the optimization should be conducted in consideration that the energy balance is closely related to the voltage-transmittance characteristics of the element and the dynamic characteristics (response) of the liquid crystal.

In considering the energy balance, the elastic property of the polymer matrix is important in obtaining stability in the arrangement of the liquid crystal. When the polymer matrix has a sufficiently large elastic modulus in comparison with the elastic constant of the liquid crystal used (namely, the matrix is sufficiently harder than the liquid crystal), there takes place little deformation of the matrix when the liquid crystal is re-oriented upon the application of an electric field. Accordingly, the arrangement of the liquid crystal is determined solely by the electric characteristics and the elastic energy of the liquid crystal itself keeping the shape of the liquid crystal particles without applying an electric field.

On the other hand, when the matrix itself is deformed in the re-orientation of the liquid crystal by the application of an electric field, the arrangement of the liquid crystal is determined by the electric energy and elastic energy of the liquid crystal itself and the elastic energy of the matrix. Generally, the elastic constant of the liquid crystal is about $10^{-11}$ N and the average diameter of the liquid crystal particles is in a range of about 1 $\mu$m-3 $\mu$m. Accordingly, when the elastic modulus of the matrix is about $10^7$ N/m$^2$ or smaller, the deformation of the matrix contributes to enhance the elastic energy. In such soft matrix, the re-orientation of the liquid crystal takes place with a deformation of matrix in response to an electric field applied.

As a factor to cause the hysteresis, it is considered that a change of the arrangement of the liquid crystal in each of the liquid crystal particles results in a large change of the dielectric constant of that portion. The change of the dielectric constant causes a change of the electric field at the portion of other liquid crystal particles. Accordingly, the arrangement of the liquid crystal particles dispersed in the system is not primarily determined by a voltage applied from the outside. From the above standpoint, it is desirable that the form of the matrix can be changed when the arrangement of the liquid crystal is changed. Namely, it is preferable that the matrix is soft. In a sufficiently hard matrix, the boundary surface of the liquid crystal to the matrix is fixed. Accordingly, when the intensity of the electric field applied is increased, a rapid change of the arrangement (Freedericksz transition) results at a certain intensity of the electric field. When such change is produced, there causes a large change of the dielectric constant to thereby result hysteresis.

On the other hand, in a sufficiently soft matrix, it is difficult to cause a rapid change of the arrangement of the liquid crystal, and the deformation of the matrix provides a stable arrangement of the liquid crystal when an electric field is applied, hence, the hysteresis is reduced. Further, in the sufficiently soft matrix, a change of the the arrangement of the liquid crystal and a deformation of the matrix take place by applying a small electric energy from the outside. Accordingly, there is an advantage that the reduction of the hysteresis and the driving of the liquid crystal display element at a low voltage can be easily achieved simultaneously.

From the reasons as described above, it is preferable that the elastic modulus of a polymer material which constitutes the matrix is $3 \times 10^7$ N/m$^2$ or less at 20° C., more preferably $1.5 \times 10^7$ N/m$^2$ or less.

When the elastic modulus of the matrix is excessively small, there is a problem that the structure of the matrix becomes unstable, or a sufficient energy to restore the arrangement of the liquid crystal is not obtainable at the time of turning-on or off of the electric field. Namely, the elastic modulus of the matrix has the lower limit of $1 \times 10^3$ N/m$^2$ at 40° C. When the matrix is used in the normal room temperature, the elastic modulus is in a range from $3 \times 10^7$ N/m$^2$ to $1 \times 10^3$ N/m$^2$ in a temperature range of 20° C.-40° C. In particular, the elastic modulus of $5 \times 10^3$ N/m$^2$ or more is preferred.

In order to achieve the reduction of the hysteresis in a practical range of temperature, the glass transition temperature of the matrix should be sufficiently lower than an usable temperature range. Specifically, it is preferable that the temperature at which the loss modulus resulted from the glass transition of main chain of the polymer material which constitutes the polymer matrix of the liquid crystal and polymer composite material becomes the maximum (peak value), is lower than the usable temperature range. It is generally preferable that the temperature at which the loss modulus becomes the maximum is 0° C. or lower.

The polymer material referred to the above means a polymer material without including liquid crystal. In definition, the elastic modulus is a dynamic storage modulus obtained by visco-elastic measurement, in which a dynamic strain (a sine wave, 11 Hz) of 1% or lower is applied to a material sample to produce a tensile strength and a temperature-rising rate is 3° C./min.

The polymer portion of the polymer matrix may be formed of only polymer or may be swollen by the liquid crystal. In general, when the polymer is swollen by the liquid crystal, the glass transition temperature as the liquid crystal and polymer composite material moves to a low temperature region in comparison with the case of using the polymer only, and the elastic modulus as the absolute value is also decreased. Accordingly, a polymer material satisfying the above-mentioned range is used as a matrix-forming material, and further, swelling of the polymer material by the liquid crystal should be utilized, so that a further fine control of the elastic modulus of the matrix is possible. An amount of the liquid crystal used for swelling the polymer in the matrix varies depending on a liquid crystal material used and a polymer material used. Generally, the liquid crystal can be used in a range of 0% to several tens% by weight to the polymer material to be swollen.

Accordingly, the elastic modulus of the matrix swollen by the liquid crystal should be in a range lower than the elastic modulus of a matrix that only the polymer material is used (specifically, it is preferable to be $8 \times 10^6$ N/m$^2$ or less at 20° C., and more preferably, $4 \times 10^6$ N/mz or less. Further, the elastic modulus of the matrix preferably has its lower limit of $10^3$ N/m$^2$ or more at 40° C., more preferably, $2 \times 10^3$ N/m$^2$ or more. Further, it is preferable that the temperature of the liquid crystal and polymer composite material at which the loss modulus of the matrix swollen by the liquid crystal becomes the maximum is $-5$° C. or lower.

On the other hand, the glass transition temperature can be reduced by incorporating to the polymer material a compound such as $-Si(CH_3)_2-O-)_n-$(-polysiloxane structure) or $-C_6H_{12}-$(hexamethylene structure) or the like. Alternatively, such structure may be provided in a part of the polymer material used.

Further, a curable compound having 1–10 functional groups per 1 molecule is preferably selected. Further, in order to obtain stability in structure, a polymer having from 2 to 6 functional groups is preferably used in an amount of 5% by weight or more to the total matrix material forming a polymer matrix. Further, in order to control the diameter of the liquid crystal particles, the distribution of the diameter of the particles, the density of the particles and so on in the liquid crystal and polymer composite material, two or more curable compounds having different molecular weight should be mixed wherein the ratio of the largest molecular weight to the smallest molecular weight is 1.5 or more.

As an example of the method of preparing the liquid crystal and polymer composite material, a curable compound or curable compounds which satisfy the above-mentioned range of physical properties after curing and a liquid crystal material are uniformly dissolved to thereby form a phase separation structure of liquid crystal and the polymer matrix upon curing the curable compounds. In this case, it is possible to control the characteristics of the matrix and a solubility balance of the system before and after the curing by suitably mixing another curable compound and/or a reaction initiator. In particular, it is desirable to use a photo-curable vinyl type compound to form a phase separation structure by irradiating light from both aspects of structure control and processability. In this case, it is desirable to use an acryl type compound, particularly, a compound having an acryl group as the functional group.

It is in particular important that the dielectric constant and the dielectric anisotropy $\Delta\epsilon$ of the liquid crystal and the dielectric constant of the polymer matrix are balanced in order to reduce the hysteresis resulted from the fact that the liquid crystal particles are dispersed in the polymer matrix. Further, the shape of the liquid crystal particles is also an important factor. By taking the balance between the above-mentioned factors and other factors, the performance of the optical element or the display element can be increased. It is preferable that the dielectric anisotropy $\Delta\epsilon$ of the liquid crystal used satisfies the following relation:

$$5 < \Delta\epsilon < 13$$

The value $\Delta\epsilon$ is a quantity related to both the hysteresis and a driving voltage wherein the upper limit of the quantity is determined by the magnitude of the hysteresis and the lower limit is determined by the driving voltage. The above-mentioned condition is apparently disadvantageous from common knowledge on the conventional TN type liquid crystal display element that the larger the value $\Delta\epsilon$ is, the lower the driving voltage is. However, such view on the conventional TN type liquid crystal display element wherein the driving voltage is in inverse proportion to the square root of $\Delta\epsilon$ is not established in a system in which the liquid crystal particles are dispersed, because a distribution of voltage in a liquid crystal portion and a matrix portion varies depending on arrangement of the liquid crystal. In the liquid crystal and polymer composite material of the present invention, $\Delta\epsilon$ does not much influence to the driving voltage. If $\Delta\epsilon$ is determined to be larger than 5, the driving voltage does not become extremely high by reducing $\Delta\epsilon$.

It is preferable that the dielectric constant $\Delta\epsilon$ of the liquid crystal and polymer composite material at a low voltage which is sufficiently lower than the threshold voltage, and the dielectric anisotropy $\Delta\epsilon$ of the liquid crystal used have the relation:

$$\Delta\epsilon < 1.45 \, \epsilon_m$$

in order to reduce the hysteresis.

When $\Delta\epsilon$ exceeds that range, movement of the liquid crystal in a single liquid crystal particle causes a large change of dielectric constant in that particle. As a result, a large change of electric field is created around the particle, whereby an electrical interaction between liquid crystal particles, which is the major factor to cause the hysteresis, becomes large. The $\epsilon_m$ is a quantity related to the dielectric constant Of the polymer matrix. When the dielectric constant of the polymer matrix increases, the dielectric constant $\epsilon_m$ of the liquid crystal and polymer matrix composite material will increase, whereby the available range of $\Delta\epsilon$ will expand.

As the liquid crystal for the present invention, a nematic liquid crystal or a smectic liquid crystal can be used. However, use of the nematic liquid crystal is preferred. The colesteric liquid crystal may be partly added to the nematic liquid crystal, or a dichroic dye or the ordinary dye may be added. Further, a viscosity controller, a spacer such as alumina particles, glass fibers or the like, or an additive may be added.

The refractive index anisotropy $\Delta n$ of the liquid crystal is also an important factor in determination of the electro-optical characteristics. In order to obtain a strong scattering function in a state that no electric field is applied, it is preferable that the refractive index anisotropy of the liquid crystal used is 0.18 or more, more preferably, 0.20 or more.

In the present invention, the transmittance at the light transmission state is preferably increased by making the refractive index of the liquid crystal agreement with that of the polymer matrix when a voltage is applied. For this, a nematic liquid crystal having a positive dielectric anisotropy is used so that the ordinary refractive index $(n_0)$ of the liquid crystal is substantially in coincidence with the refractive index of the polymer matrix. Then, a high transparent state is obtainable at the time of applying a voltage. Specifically, it is preferable to satisfy the relation of $n_0-0.03 < n_p < n_0+0.05$.

It is preferable that the liquid crystal dispersed and held in the polymer matrix is formed of liquid crystal particles which are independent from each other or partially connected liquid crystal particles. The liquid crystal of this kinds effectively function to provide a high scattering property and a high transmittance at a low driving voltage. A scattering phenomenon is resulted at the interface between the liquid crystal and a polymer material. A greater surface area of the interface improves the scattering property.

When the surface area of the interface is to be increased with a certain average particle diameter of the liquid crystal particles, it is important that an amount of the liquid crystal is increased separate from the polymer material, namely, the density of the liquid crystal particles is made large. However, when an amount of the liquid crystal is made large separate from the polymer material, some liquid crystal particles will be connected, and finally, all liquid crystal particles are connected to each other. Such structure of the liquid crystal will reduce the scattering property because the interface between the liquid crystal and the polymer matrix which are separated from each other, disappears.

Further, it is important for lowering the driving voltage that liquid crystal separately held in the polymer matrix has the substantially equal driving electric field. For this purpose, a clear interface should be formed between the liquid crystal and the polymer matrix. The loss of the interface scatters the driving electric field, whereby reduction of the contrast ratio and increase in the driving voltage are apt to occur. It is, therefore, preferable that the liquid crystal dispersed and held in the polymer matrix is constituted by independent particles or partially connected particles in a high density state.

In the above explanation, use of a single liquid crystal optical element has been explained. However, when three liquid crystal display elements may be used for a projection type liquid crystal display apparatus wherein three kinds of light (R, G and B) are caused to pass through each liquid crystal display element, the characteristics of each of the liquid crystal elements should be uniformly adjusted for each color by adjusting the size of the liquid crystal, the inter-substrate gap, the refractive index of the liquid crystal and so on.

In order to improve the scattering property when no electric field is applied, it is effective to increase the volume fraction $\Phi$ of the the liquid crystal which is operable in the liquid crystal and polymer composite material. The range of $\Phi > 20\%$ is preferred. In order to obtain higher scattering property, it is preferable to be $\Phi > 35\%$, more preferably $\Phi > 45\%$. On the other hand, when the value $\Phi$ is excessively high, the stability in structure of the liquid crystal and polymer composite material becomes inferior. Accordingly, it is preferable that $\Phi < 70\%$.

In the liquid crystal optical element of the present invention, it is preferable that the ordinary refractive index ($n_0$) of the liquid crystal used substantially coincides with the refractive index of the polymer matrix. In this case, a scattering state (i.e., an opaque state) is shown due to a difference in refractive index between the liquid crystal which is not forcibly oriented in the normal direction of a substrate and the polymer matrix when no electric field is applied. Accordingly, light is scattered by a portion of the liquid crystal optical element at which no electrode is located. When said liquid crystal optical element is used for a projection type display apparatus, the portion other than picture elements looks dark because light does not reach a projection screen without light shielding layer at said portion. In order to prevent light from leaking from any other portion of the liquid crystal optical element than the picture element electrodes, it is unnecessary to provide a light shielding layer for the portion other than the picture element electrodes. Accordingly, there is an advantage that the step of forming the light shielding layer is unnecessary.

An electric field is applied to a desired picture element. At the picture element portion to which the electric field is applied, the liquid crystal is oriented to the direction of the field, so that the ordinary refractive index ($n_0$) of the liquid crystal and the refractive index ($n_p$) of the polymer matrix coincide with each other. Accordingly, the liquid crystal display element presents a transparent state, and light is transmitted through desired picture elements to thereby provide a bright display on a projection screen.

If the curable compound is cured during the curing step while a sufficiently high voltage is applied only to a specified portion of the element, the portion is formed to have a normally light transparent state. Accordingly, in a case that there is to form a fixedly display portion, such a normally transparent portion may be formed.

In the liquid crystal display element of the present invention, a colored display can be attained by providing a color filter. Color filters having different three colors may be provided in a single liquid crystal display element, or a color filter for a specified color may be provided in a single liquid crystal display element and three liquid crystal display elements having different color filters may be used in combination. The color filter may be provided on the surface having electrodes of the substrate or may be provided at the outside of the substrate.

Further, dye, pigment or the like may be mixed into the liquid crystal and polymer composite material to conduct a color display.

Preferred embodiments of the liquid crystal display element and the projection type liquid crystal display apparatus of the present invention will be described with reference to the drawings.

Figure 1:
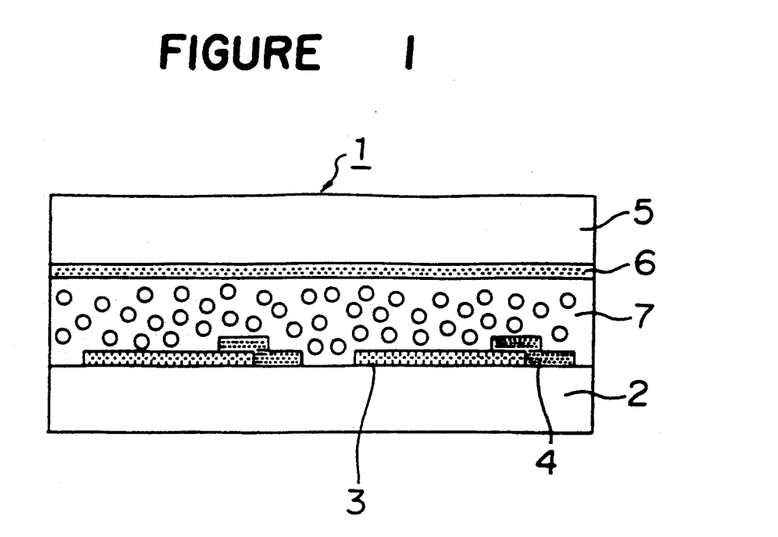
FIG. 1 is a diagram showing the basic construction of an embodiment of the liquid crystal optical element of the present invention.

FIG. 1 is a cross-sectional view showing an embodiment of the liquid crystal display element of the present invention in which an active matrix substrate is used.

In FIG. 1, reference numeral 1 designates a liquid crystal display element, numeral 2 designates a substrate such as glass, plastics or the like which is used as an active matrix substrate, numeral 3 designates a picture element electrode such as ITO ($In_2O_3$-$SnO_2$), $SnO_2$ or the like, numeral 4 designates an active element such as a transistor, a diode, a non-linear resistance element or the like, numeral 5 designates a substrate such as glass, plastics or the like which is used as a counter electrode substrate, numeral 6 designates a counter electrode such as ITO, $SnO_2$ or the like, and numeral 7 designates a liquid crystal and polymer composite material interposed between the substrates.

Figure 2:
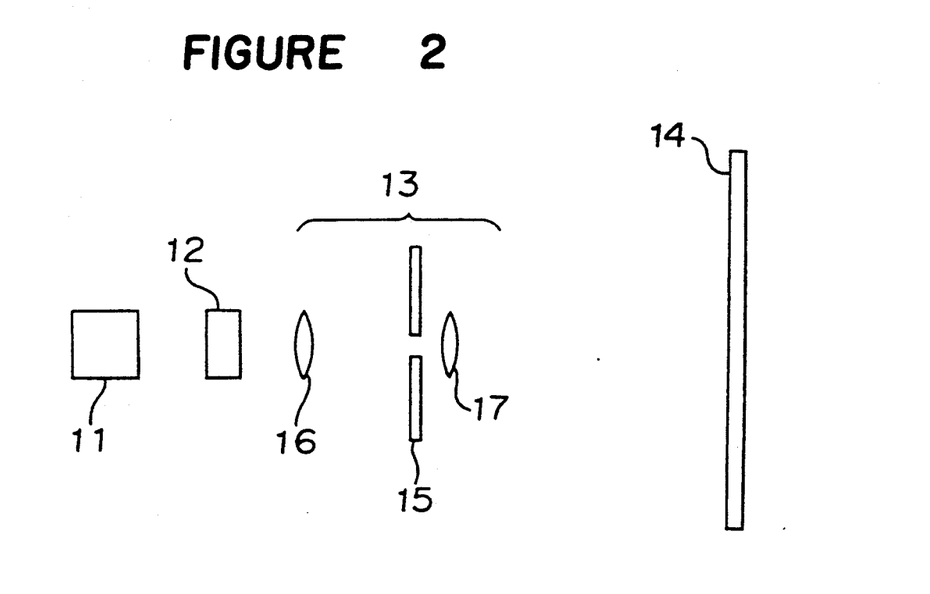
FIG. 2 is a diagram showing the basic construction of an embodiment of a projection type active matrix liquid crystal display apparatus according to the present invention.

FIG. 2 is a diagram showing an embodiment of the projection type liquid crystal display apparatus in which the liquid display element as shown in FIG. 1 is used.

In FIG. 2, reference numeral 11 designates a projection light source, numeral 12 designates a liquid crystal display element, numeral 13 designates a projection optical system including elements such as a lens, an aperture and so on, and numeral 14 designates a projection screen. In this embodiment, the projection optical system includes an aperture means or spot 15 constituted by a perforated plate, a focusing lens 16 and a projection lens 17.

In a case of using a three-terminal element such as TFT (thin film transistor) as the active element, a solid electrode (entire surface) in common with all picture elements may be disposed for the counter electrode substrate. In the case of using a two-terminal element such as an MIM element or a PIN diode, however, the counter electrode substrate is applied with a stripe-like patterning.

In the case of using TFT as the active element, silicon is suitable as the semiconductor material. Polycrystalline silicon is particularly preferred since it has less photosensitivity as in amorphous silicon and, accordingly, does not cause erroneous operation even without shielding light from a light source by means of a light shielding film, or with a thin light shielding layer to the active element. In the case of using polycrystalline silicon for the projection type liquid crystal display apparatus in the present invention, a strong light source for projection can be utilized and a bright display is obtainable.

In the case of the conventional TN type liquid crystal optical element, a light shielding film is often formed between picture elements so as to suppress the leakage of light from the portion between the picture elements, and a light shielding film can be formed to the active element at the same time of forming the light shielding film between the picture elements. Accordingly, formation of the light shielding film to the active element gives no substantial effect on the entire steps. Namely, if the polycrystalline silicon is used for the active element and the light shielding film is not formed to the active element portion, the number of steps can not be decreased if it is required to form the light shielding film at the portion between the picture elements.

On the contrary, in the present invention, it is preferable that the liquid crystal and polymer composite material wherein the refractive index of the polymer matrix substantially agrees with the ordinary refractive index ($n_0$) of the liquid crystal used, is used as described before. Accordingly, when light is scattered at the portion not applied with the electric field, it appears dark on the projection screen. Accordingly, there is no requirement for forming the light shielding film in the portion between the picture elements. Therefore, in the case of using the polycrystalline silicon as the active element, there is no requirement for forming the light shielding film at the active element portion, and accordingly, the step of forming the light shielding film can be eliminated, whereby the productivity is improved.

Even in the case of using the amorphous silicon, if the light shielding film is formed at the semiconductor portion, the liquid crystal optical element of the present invention can be used.

Further, the electrodes used are usually transparent electrodes. In the case of using the electrodes for a reflection type liquid crystal display apparatus, however, a reflection electrode made of a material such as Cr, Al or the like may be used.

In the liquid crystal display element and the liquid crystal display apparatus according to the present invention, an infrared ray cut filter or UV-ray cut filter or the like may be used in a lamination form, or characters, figures or the like may be printed, or a plurality of liquid crystal optical elements may be used.

Further, in the present invention, a protective plate such s glass plate, a plastic plate or the like may be overlaid on or at the outside of the liquid crystal optical element. The protective plate reduces a danger of the breakage of the optical element when the surface of the element is pushed, whereby the safety of the optical element is improved.

In the case of using a photo-curable compound as a curable compound constituting the liquid crystal and polymer composite material as described above in the present invention, photo-curable vinyl compound is preferably used.

Specifically, there can be exemplified a photo-curable acryl compound.

When the photo-curable compound is used, it is preferable to uniformly dissolve the photo-curable compound in the liquid crystal. The cured material after exposure to light can not be dissolved or is hardly dissolved. When the above-mentioned composition is used, it is desirable to use the liquid crystal having a closer value in solubility.

In the present invention, when the liquid crystal in the liquid crystal and polymer composite material is utilized as the solvent, and the photo-curable compound is cured by the exposure to light, it is unnecessary to evaporate solvent or water which is needless at the curing time. Accordingly, in this case, the conventional method of preparation of the injection of liquid crystal to the cell can be employed because the curable compound is cured in an enclosed system. The curing of the curable compound in the enclosed system provides high reliability. This can be further assured by the effect obtained by bonding the two substrates with the photo-curable compound.

In the present invention, since the liquid crystal and polymer composite material is used, a possibility that the upper and lower transparent electrodes may short-circuit can be reduced, and it is unnecessary to strictly control the orientation of the liquid crystal and the substrate gap as required for the conventional TN type display element. Accordingly, the liquid crystal optical element capable of controlling a transparent state and a scattering state can be effectively produced.

The projection light source, the projection optical system, the projection screen and so on used in the present invention may be a conventionally used light source, projection optical system, projection screen and so on. It is enough that the liquid crystal display element is disposed between the projection light source and the projection optical system. The projection optical system may be used so that images from the plurality of the liquid crystal display elements are synthesized with use of an optical system and the synthesized image is displayed.

In addition, a cooling system may be added, or a TV channel display devise such as LED or the like may be added.

In particular, in the case of using the projection type display, a device for reducing diffusion light, e.g. an aperture or a spot as indicated by numeral 15 in FIG. 2 may be disposed on the optical path so that the contrast ratio of display can be increased. Namely, as the device for reducing diffusion light, it is preferred to use such a device that among incident light passing though the liquid crystal optical element, straight-forward light (light which has transmitted portions in which the picture element portions are in a transparent state) is taken, and non-straight-forward light (light scattered at portions in which the liquid crystal and polymer composite material is in a scattering state) is diminished. In particular, the device which does not reduce the straight-forward light but reduces diffusion light (the non-straight-forward light), is preferred.

FIG. 2 shows a concrete example of the device for reducing diffusion light. The device is constituted by a liquid crystal display element and a projection optical system, specifically, a liquid crystal display element 12, a focussing lens 16, an aperture or a spot 15 which may be a perforated plate and a projection lens 17.

In operation of the device shown in FIG. 2, light emitted from the projection light source passes through the liquid crystal display element 12. Among the light passing through the display element 12, straight-forward light in incident light is collected by the focussing lens 16; the collected light is passed through the aperture or the spot 15 and is projected on the projection screen through the projection lens 17. On the other hand, light which is not straight forward and scatters at the liquid crystal display element 12 does not pass through the aperture or spot 15 even though it is collected by the focussing lens 16. Accordingly, scattered light is not projected, and the contrast ratio can be improved.

As another embodiment, a mirror having a small surface area is arranged obliquely at the same position, instead of the aperture or the spot 15. Light reflected by the mirror is projected through a projection lens disposed on the optical axis of the mirror. Further, a spot or mirror or the like may be disposed at a position where light beams are focused by a projection lens, without using the focussing lens.

The focal length or the diameter of a projecting lens may be suitably selected so as to remove scattering light, without using a specially arranged aperture.

Further, a microlens system can be used. Specifically, a combination of a microlens array and a spot array in which fine holes are formed in array may be disposed at the side of the projection optical system with respect to the liquid crystal display element to thereby remove needless scattering light. This arrangement has an advantage of reducing the entire size of the projection type display apparatus because the optical path length necessary for removing scattering light can be remarkably shortened. In order to reduce the optical path length, the installation of the scattering light removing system which is the device for reducing diffusion light in the projection optical system is effective way. The structure of projection type display apparatus in which the scattering light removing system is installed in the projection optical system is simpler than the structure in which the projection optical system and the scattering light removing system are independently disposed, whereby the entire size of the apparatus can be reduced.

These systems may be used in combination with a mirror, a dichroic mirror, a prism, a dichroic prism, a lens and so on to synthesize a picture image and to display a colored image. Further, a colored picture image is obtainable by combining the optical system with a color filter.

The ratio of the scattered light component and the straight-forward light component reaching on the projection screen can be controlled by adjusting the diameter of the spot or the mirror and the focal length of the lens, so that a desired contrast ratio of display and the brightness in display can be obtained.

When the device for reducing diffusion light as shown in FIG. 2 is used, light entering from the projection light source to the liquid crystal display element should be parallel in order to increase the brightness of display. For this, it is preferable to constitute a projection light source by combining a light source capable of providing high brightness (which should be a point light source), a concave mirror, a condenser lens and so on.

Description has been made mainly as to the transparent type display apparatus. However, the present invention is applicable to a reflection type liquid crystal display apparatus wherein a small mirror is disposed, instead of a spot, to take out only necessary light.

In the following, the present invention will be described more in detail in connection with various examples.

EXAMPLE 1

A nematic liquid crystal having a positive dielectric anisotropy ($\Delta n = 0.24$, $\Delta\epsilon = 11.8$, $K33 = 15 \times 10^{-12}$ N and $\eta = 40cSt$), two kinds of acrylate monomer (2-ethylhexyl acrylate and 2-hydroxyethyl acrylate), a bifunctional urethaneacrylate oligomer ("UX4101" manufactured by Nippon Kayaku Company) and a photo initiator were uniformly dissolved to prepare an uncured mixture. The proportion of the liquid crystal in the mixture was 66% by weight.

An active matrix substrate having a polycrystal silicon TFT for each picture element and a counter electrode substrate on which a solid electrode (entire surface) was formed were sealed at their peripheral portions with use of a sealing material to thereby prepare a cell having an electrode substrate gap of 13 $\mu$m.

The uncured mixture was injected to the cell, and it was exposed to UV rays to cure the mixture to thereby form a liquid crystal and polymer composite material. The driving voltage of the liquid crystal display element was about 8V.

When the dielectric constant of the liquid crystal and polymer composite material was measured by the application of a voltage (0.3V) which was lower than the threshold voltage, it was found that the dielectric constant was about 8.2 in terms of 1 kHz. When the liquid crystal display element was driven with a video signal, a dynamic display was obtained substantially free from image-sticking even when the picture image was changed.

The liquid crystal display element was combined with a projection light source and a projection optical system to prepare a projection type display apparatus. When a picture image was projected on the screen, the contrast ratio on the screen was about 110. The correction cone angle (which is determined by $2\tan^{-1}(\Phi/2f)$, in which $\Phi$ is the diameter of the aperture (spot) and f is the focal length of the lens) of the projection optical system was about 6° in total angle.

A mixture was prepared by removing the liquid crystal from the above-mentioned mixture, and UV rays were irradiated to cure the mixture to thereby produce a film having a thickness of about 500 $\mu$m and a length of about 15 mm. The elastic modulus (dynamic elastic modulus) of the film was measured with use of a viscoelastic measuring device (Rheovibron DDV model manufactured by Orientec Co.) to find $5 \times 10^6$ N/m$^2$ at 20° C. and $3 \times 10^5$ N/m$^2$ at 40° C. This showed a reduction in a linear form to temperature rise. It was found that the temperature at which the loss modulus became the maximum was $-10°$ C. The measurement was conducted by applying vibrations with a sine wave having a frequency of 11 Hz and a dynamic strain of 1% or less when a sample was pulled at temperature-rising rate of 3° C./min.

COMPARATIVE EXAMPLES 1 AND 2 AND EXAMPLE 2

An active matrix liquid crystal display element was prepared in the same manner as in Example 1 except that only polymer material was changed.

For Comparative Example 1, the bifunctional urethaneacrylate oligomer in Example 1 was changed to "M1200" manufacture by Toa Gosei Co. The driving voltage to the element was 9V.

For comparative Example 2, the 2-etheylhexyl acrylate in which a part of monomer is different, in Example 1 was replaced by a bifunctional acrylate monomer ("SR640" manufactured by Sartomer Co.). The driving voltage to the element was 12V.

In Example 2, oligomer used was partly different from that used in Comparative Example 1 and a liquid crystal and polymer composite material was obtained by replacing a ⅓ part of the oligomer "M1200" used in Comparative Example 1 by a curable compound having acroyl groups at both ends of dimethylsiloxane having a molecular weight of about 3,000. The driving voltage to the element was 10V.

The liquid crystal display element was driven by a video signal to find if there was an image-sticking phenomenon at the time of switching a picture image. The liquid crystal display element was combined with a projection light source and a projection optical system to form a projection type display apparatus. With use of the projection type display apparatus, a picture image was projected on a screen to measure a contrast ratio on the screen. The cone collection angle of the projection optical system was determined to be 6° in the total angle.

A mixture was prepared by removing the liquid crystal from the above-mentioned three kinds of mixture. The mixture was cured by irradiating UV rays to prepare a film having a thickness of about 500 μm and a length of about 15 mm. The elastic modulus of the film was measured by the viscoelastic measuring device at 20° C. and 40° C. respectively.

The temperature at which the loss modulus due to the glass transition of main chain became the maximum was measured. The conditions of measurement were the same as Example 1. Further, the magnitude (area of hysteresis loop) of the hysteresis in the voltage-transmittance characteristics of the element was measured.

Results obtained are shown in Table 1.

In Table 1, "YES" and "NO" represent the presence or absence of the image-sticking phenomenon at the time of changing a picture image; $N/m^2$ represents the elastic modulus; ° C. represents the temperature at which the loss modulus becomes the maximum, and the magnitude of the hysteresis is represented by ratio to the magnitude (area of hysteresis loop) of the hysteresis of Example 1. The elastic modulus was linearly reduced to the temperature rise from 20° C. to 40° C.

TABLE 1

| | Comparative Example 1 | Comparative Example 2 | Example 2 |
|---|---|---|---|
| 1) Image-sticking phenomenon | YES | YES | NO |
| 2) Contrast ratio | 110 | 70 | 80 |
| 3) Elastic modulus: | | | |
| 20° C. | $1 \times 10^8$ | $4 \times 10^8$ | $2 \times 10^6$ |
| 40° C. | $5 \times 10^6$ | $2 \times 10^7$ | $4 \times 10^5$ |
| 4) Temperature of the maximum loss modulus | 11 | 22 | −5 |
| 5) Hysteresis ratio | 3 | 11 | 0.5 |

In the liquid crystal optical element of the present invention, since a liquid crystal and polymer composite material which electrically controls a scattering state and a transparent state is used as a liquid crystal material and the liquid crystal and polymer composite material is held between a pair of substrates with electrodes to thereby form a liquid crystal optical element, polarization plates are unnecessary, whereby the transmittance of light in a light-transparent state can be remarkably improved.

The liquid crystal optical element of the present invention has a high contrast ratio and provides a display of high brightness even when a conventional driving IC for a TN type liquid crystal optical element is used.

In accordance with the present invention, it is possible to obtain a gray scale display having a clear halftone when gray scale driving is conducted, and to reduce an image-sticking phenomenon due to the hysteresis.

Accordingly, the liquid crystal optical element of the present invention is effective to a projection type display, and a projection type display apparatus having no or little image-sticking, high brightness, and good contrast ratio can be obtained. Further, it is possible to reduce the size of a light source.

Further, since it is unnecessary to use the polarization plates, the wavelength dependency of the optical characteristics is small and there is little requirement for color correction for the light source.

Further, possible problems of orientation processing such as rubbing necessary for the TN type liquid crystal display element and destruction of the active element due to the orientation processing and static electricity generated from the processing can be avoided, and the yield of production of the liquid crystal optical elements can be improved significantly.

Since the liquid crystal and polymer composite material is formed in a form of film after curing, such problems of short-circuiting between the substrates by a pressure applied thereon and destruction of the active elements by displacement of spacers can be minimized.

Further, the liquid crystal and polymer composite material is similar in specific resistance to that in the conventional TN mode, and great storage capacitor need not be provided for each picture elements as in the DS mode. Accordingly, designing of the active elements can be facilitated and the ratio of an effective picture element electrode area can be increased, and power consumption of the liquid crystal optical element can be small.

Further, since the liquid crystal optical element can be produced only by eliminating the orientation film forming step from a conventional process of production of the liquid crystal optical element of the TN mode, production of the element can be easy.

The liquid crystal optical element which employs the liquid crystal and polymer composite material has a feature that the response time is short, and a display of dynamic picture can be made easily. Further, since the electric-optical characteristics (voltage-transmittance dependence) of the liquid crystal optical element is looser than a conventional liquid crystal optical element of the TN mode, it can be easily applied to display gray scale.

In the liquid crystal optical element of the present invention it is preferable that the refractive index of the polymer matrix substantially agrees with the ordinary refractive index of the liquid crystal. Accordingly, light is scattered by a portion to which no electric field is applied and there is no leak of light upon projection of light even if a light shielding layer for interrupting light is not provided at the portion other than picture elements. Accordingly, there is no necessity of provision of a light shielding means between adjacent picture elements. Accordingly, where an active element made of polysilicon is used, a projection light source of a high brightness can be used without using a light shielding layer to the active element, whereby a projection type liquid crystal display apparatus of a high brightness can be easily obtained. Further, no light shielding layer is necessary in this instance, and accordingly, the process of production can be simplified.

In the present invention, various applications are possible as far as the effect by the present invention is not injured.

What is claimed is:

1. A liquid crystal optical element comprising a pair of substrates with electrodes and a liquid crystal and polymer composite material, which is interposed between the pair of substrates, in which liquid crystal is dispersed and held in a polymer matrix so that the refractive index of the polymer matrix substantially coincides with the refractive index of the liquid crystal used in either state of applying of a voltage or without applying a voltage, and the above refractive indices don't coincide with each other in the other state, characterized in that the elastic modulus of the polymer material which forms the polymer matrix is $3 \times 10^7$ N/m$^2$ or less at 20° C. and $1 \times 10^3$ N/m$^2$ or more at 40° C.

2. The liquid crystal optical element according to claim 1, wherein the temperature at which the loss modulus of the polymer material which forms the polymer matrix becomes the maximum, is 0° C. or less.

3. The liquid crystal optical element according to claim 1, wherein the polymer material which forms the polymer matrix is obtained by photo-curing a photocurable vinyl type compound.

4. The liquid crystal optical element according to claim 1, wherein the dielectric anisotropy $\Delta\epsilon$ of the liquid crystal used satisfy the relation of $5 < \Delta\epsilon < 13$.

5. The liquid crystal optical element according to claim 4, wherein the dielectric anisotropy $\Delta\epsilon$ of the liquid crystal used satisfy the relation of $\Delta\epsilon < 1.45 \cdot \epsilon_m$ where $\Delta_m$ is the dielectric constant of the liquid crystal and polymer composite material at a low voltage sufficiently lower than the threshold voltage.

6. The liquid crystal optical element according to claim 1, wherein the liquid crystal used is a nematic liquid crystal having a positive dielectric anisotropy, and the ordinary refractive index (n$_0$) of the liquid crystal substantially coincides with the refractive index n$_p$ of the polymer matrix.

7. The liquid crystal optical element comprises a liquid crystal as defined in claim 1, which effects a display including a half-tone display.

8. A liquid crystal display element for effecting a display including a half-tone display which comprises an active matrix substrate having an active element for each picture element electrode, a counter electrode substrate provided with a counter electrode and a liquid crystal and polymer composite material in which a nematic liquid crystal having a positive dielectric anisotropy is dispersed and held in a polymer matrix so that the refractive index of the polymer matrix substantially coincides with the ordinary refractive index (n$_0$) of the liquid crystal used, said liquid crystal and polymer composite material being interposed between the active matrix substrate and the counter electrode substrate, characterized in that the elastic modulus of the polymer material which forms the polymer matrix is $3 \times 10^7$ N/m$^2$ or less at 20° C. and $1 \times 10^3$ N/m$^2$ or more at 40° C.

9. The liquid crystal display element according to claim 8, wherein the temperature at which the loss modulus of the polymer material which forms the polymer matrix becomes the maximum, is 0° C. or less.

10. The liquid crystal display element according to claim 8, wherein the polymer material which forms the polymer matrix is obtained by photo-curing a photocurable vinyl type compound.

11. The liquid crystal display element according to claim wherein the dielectric anisotropy $\Delta\epsilon$ of the liquid [crystal used satisfy the relation of $5 < \Delta\epsilon < 13$.

12. The liquid crystal display element according to claim 11, wherein the dielectric anisotropy $\Delta\epsilon$ of the liquid crystal used satisfy the relation of $\Delta\epsilon < 1.45 \cdot \epsilon_m$ where $\epsilon_m$ is the dielectric constant of the liquid crystal and polymer composite material at a low voltage sufficiently lower than the threshold voltage.

13. The liquid crystal display element according to claim 8, wherein said active element is a thin film transistor.

14. The liquid crystal display element according to claim 13, wherein said active element is a polycrystal silicon thin film transistor.

15. A projection type liquid crystal display apparatus which comprises in combination a liquid crystal display element as defined in claim 8, a projection light source and a projection optical system.

16. The projection type liquid crystal display apparatus according to claim 15, which further comprises a liquid crystal display element wherein the dielectric anisotropy $\Delta\epsilon$ of the liquid crystal satisfy the relation of $5 < \Delta\epsilon < 13$.

17. The projection type liquid crystal display apparatus according to claim 16, wherein the dielectric anisotropy $\Delta\epsilon$ of the liquid crystal satisfy the relation of $\Delta\epsilon < 1.45 \cdot \Delta_m$ where $\Delta_m$ is the dielectric constant of the liquid crystal and polymer composite material at a low voltage sufficiently lower than the threshold voltage.

18. The projection type liquid crystal display apparatus according to claim 15, in which a liquid crystal optical element having a thin film transistor is used.

19. The projection type liquid crystal display apparatus according to claim 18, in which a liquid crystal optical element having a polycrystal silicon thin film transistor is used.

20. The projection type liquid crystal display apparatus according to claim 15, wherein the projection optical system comprises a device for reducing diffusion light to reduce light scattered at the liquid crystal optical element so that the device reduces light which doesn't forward straightly to incident light among light which has passed through the liquid crystal optical element.

* * * * *